United States Patent [19]

Blanding

[11] 4,012,788
[45] Mar. 15, 1977

[54] YIELDABLE, COAXIALLY-DRIVEN TAPE WRAPPING GUIDES FOR USE IN A HELICAL TAPE RECORDER

[75] Inventor: Douglass L. Blanding, Leroy, N.Y.

[73] Assignee: Eastman Kodak Company, Rochester, N.Y.

[22] Filed: Aug. 22, 1975

[21] Appl. No.: 606,994

[52] U.S. Cl. ............................. 360/85; 242/194; 360/130; 360/95

[51] Int. Cl.$^2$ .................. G11B 15/66; G11B 23/04

[58] Field of Search ............ 360/85, 95, 130, 132; 242/193–194, 197–200; 226/76, 191, 192, 189, 174

[56] References Cited

UNITED STATES PATENTS

| | | | |
|---|---|---|---|
| 3,639,697 | 2/1972 | Koguma | 360/130 |
| 3,647,984 | 3/1972 | Watanabe | 360/95 |
| 3,660,614 | 5/1972 | Swain et al. | 360/85 |
| 3,673,348 | 6/1972 | Larkin | 360/85 |
| 3,702,383 | 11/1972 | Inaga et al. | 360/85 |

FOREIGN PATENTS OR APPLICATIONS

20,674   1969   Japan .............................. 360/85

*Primary Examiner*—Alfred H. Eddleman
*Attorney, Agent, or Firm*—R. Cody

[57] ABSTRACT

A helical-scan tape recorder has a pair of tape wrapping guides, for engaging a magnetic tape and helically placing it around a recording drum, which are mounted on a pair of coaxial ring gears. Each guide is biased for cooperation with the ring gear upon which it is mounted. By providing a stop member on the recorder to intercept and restrain the yieldable guides, against their bias and before the ring gears stop, any "play" in the gearing is taken up and the guides are optimally and accurately positioned for precisely placing the span of tape around the drum.

7 Claims, 11 Drawing Figures

YIELDABLE, COAXIALLY-DRIVEN TAPE WRAPPING GUIDES FOR USE IN A HELICAL TAPE RECORDER

CROSS-REFERENCE TO RELATED APPLICATIONS

The following applications are related to each other: U.S. Pat. application Ser. No. 607,002, filed Aug. 22, 1975, entitled "Multioriented Composite-Surface Tape Guide for Use in a Cassette," by Douglass L. Blanding; U.S. Pat. application Ser. No. 607,001, filed Aug. 22, 1975, entitled "Cutaway Tape Guide for Selectively Cooperating with a Capstan and Guiding a Tape," by Douglass L. Blanding; U.S. Pat. application Ser. No. 606,995, filed Aug. 22, 1975, entitled "Rotatable Multifaceted Tape Guide for Use in a Cassette," by Thomas G. Kirn;

BACKGROUND OF THE INVENTION

1. Field of the Invention

This invention relates in general to apparatus for driving the components of a tape recorder; more particularly, the invention is concerned with apparatus for cooperating with a capstan drive assembly and for disposing magnetic tape around a recording drum so that a television signal train may be helically recorded on the tape. (As used herein, the term "recorder" shall be taken to mean apparatus which either, or both, records or plays back a video signal.).

2. Description Relative to the Prior Art

While it is not so restricted, the invention acquires a special significance when it is used with a video tape recorder of the type in which a magnetic tape is curved around a recording drum carrying one or more rotating heads. (Throughout, the terms "head" and "recording head" shall, obviously, mean a "playback head," as well.) The tape is wrapped so that it emerges from the drum at a different level from that at which it entered, describing a helical path as it travels around the drum. In this way, a television signal train may be provided to the heads and helically recorded on the tape. In existing reel-to-reel video recorders of this type, which take from one removable tape reel and pass it to another removable reel, the wrapping of the tape around the drum in preparation for recording or playback, and the unwrapping of the tape from the drum, are performed manually. Besides being an exacting and annoying operation, it may be difficult to optimally position the tape in its preferred helical path when the tape is manually wrapped around the drum.

With the introduction of video cassette machines, apparatus was devised for automatically threading the tape around the drum. In these machines, the tape is contained in a protective enclosure or cassette, and the entire enclosure is inserted into the machine. Generally, a tape door is automatically opened to allow one or more tape threading guides to be placed within the cassette and close to the tape. Without attempting to exhaustively list all the threading guide configurations that presently exist, there are a number of schemes for curving the tape around the drum which generally illustrate the state of the art. For instance, the threading guide may be mounted on a loading ring and driven counterclockwise in the loading operation and clockwise in the unthreading operation, e.g., U.S. Pat. No. 3,643,038. Most frequently, the loading ring is rim driven by a motor, which is correspondingly powered when the loading or unthreading function is selected. In another threading apparatus, a roller on the end of a pull-out arm, which operates in conjunction with the loading ring, withdraws the tape from the cassette, e.g., U.S. Pat. Nos. 3,784,761 and 3,821,805. Following withdrawal, the tape is transferred to the loading ring and wrapped around the drum.

Instead of providing a loading ring, other video cassette recorders use tape threading guides which move in paths defined by arcuate tracks on the deck of the recorder, e.g., U.S. Pat. No. 3,660,614. Motion is transmitted to the guides from a mechanical drive unit by means of a variety of mechanical linkages, levers, and gears. Arcuate tracks are avoided by U.S. Pat. No. 3,674,942, which discloses a pair of tape guides that slidably move in parallel tracks on either side of the recording drum. When mechanical linkages are used to move the threading guides, they may be designed to additionally move other components on the playing deck of the video recorder. For example, U.S. Pat. No. 3,673,348 discloses an erase head which is moved into contact with the tape by linkage with the same mechanism that advances the tape threading guides around the drum. The abovementioned U.S. Pat. No. 3,660,614 also provides a mechanical connection between a pinch roller and the guide advancing mechanism. As the guides wrap the tape around the drum, a mechanical linkage forces the pinch roller to resiliently engage the tape with a driving capstan.

What this prior art finally illustrates is that the basic challenge presented by helical wrapping is merely to move one or more tape threading guides around the recording drum and helically place the tape on the drum; the solution attempted should conceptually follow the most straightforward mechanical design to reach the intended result. Otherwise, some desirable feature or characteristic of the tape recorder may be needlessly sacrificed. Some approaches taken heretofore, as this brief overview of the prior art shows, use an elaborate network of linkages, levers, and gears to move the guides. As a result, cost is sacrificed in favor of complexity. When a less roundabout approach was attempted, as in the case of the loading ring, machine size was necessarily sacrificed.

SUMMARY OF THE INVENTION

Perceiving the need to move a pair of tape threading guides from one position to another position around the periphery of a recording drum with the least possible influence on the size and cost of the mechanical components, the invention provides, in one aspect, two gears which are positioned coaxially for rotation with respect to each other and disposed adjacent the base of a recording drum. The gears each carry a tape threading guide mounted on their periphery which projects alongside the drum on opposite sides therefor. A driven pinion is adapted to rotate one gear clockwise while an idler pinion, which meshes with the driven pinion, is adapted to drive the other gear counterclockwise. The tape threading guides, in a non-record position, are thus adapted to engage the tape when the guides are in a first position within a cassette. When the driven pinion is activated, each gear, and its associated guide, is rotated in an opposite direction about the periphery of the drum to a second position; the guides together catch the tape, pull it from the cassette, and place it on the drum.

In a second aspect, the invention meets the crucial question of accurately positioning the guides around the drum. For helical recording, as already pointed out, the tape is initially pulled from the cassette and wrapped around the recording drum at a helix angle. In addition, the helical recording format requires precise positioning of the span of tape which passes around the drum; positioning errors may cause, for example, mistracking during playback. Tracking problems are diminished, however, if the tape follows a precise path into, around, and out of the drum assembly. Because of inherent mechanical "slop" in any gear assembly, it is difficult to stop the tape threading guides at a position within the tolerance necessary for placing the tape precisely on the drum. Therefore, the invention provides for yieldably mounting the tape threading guides upon the coaxial gears. When the guides reach their second position, they strike a precisely mounted stop member which correctly positions the guides for accurately curving the tape around the drum. By providing the yieldable mounting, "play" in the gearing is taken up, as the coaxial gears proceed to rotate an additional amount against the bias of the yieldable mounting until the driven pinion is disabled.

Since the tape threading guides are translated around the drum intermittently for purposes of tape wrapping only, certain other recorder components which require a one-time positioning just before record may be operated off the motion of the guides. Therefore, in another aspect, the invention provides a lever assembly, carrying a pinch roller, which is activated by a cam attached to one of the coaxial gears. A rack gear is also carried on the lever assembly for purposes of rotating a cassette guide of the type disclosed in a copending U.S. application Ser. No. 607,001, in the name of Douglass L. Blanding, filed concurrently with and assigned to the same assignee as the present application, and incorporated herein by reference. When the tape guides pull the tape from the cassette, the cam engages the lever assembly, causing the rack to rotate the cassette guide thus exposing the tape to a capstan fitted therein, and the pinch roller to resiliently force the tape against the capstan. The invention also provides for including additional recording and/or erase heads on the lever assembly which are adapted to pivot into contact with the tape as the threading guides wrap the tape around the drum.

BRIEF DESCRIPTION OF THE DRAWINGS

The invention will be described with reference to the figures, wherein.

DESCRIPTION OF THE PREFERRED EMBODIMENTS

Because helical tape recorders are well known, particularly in connection with video recording, the present description will be directed in particular to elements forming part of, or cooperating more directly with, the present invention. Recorder elements not specifically shown or described herein may be selected from those known in the art.

Figure 1:
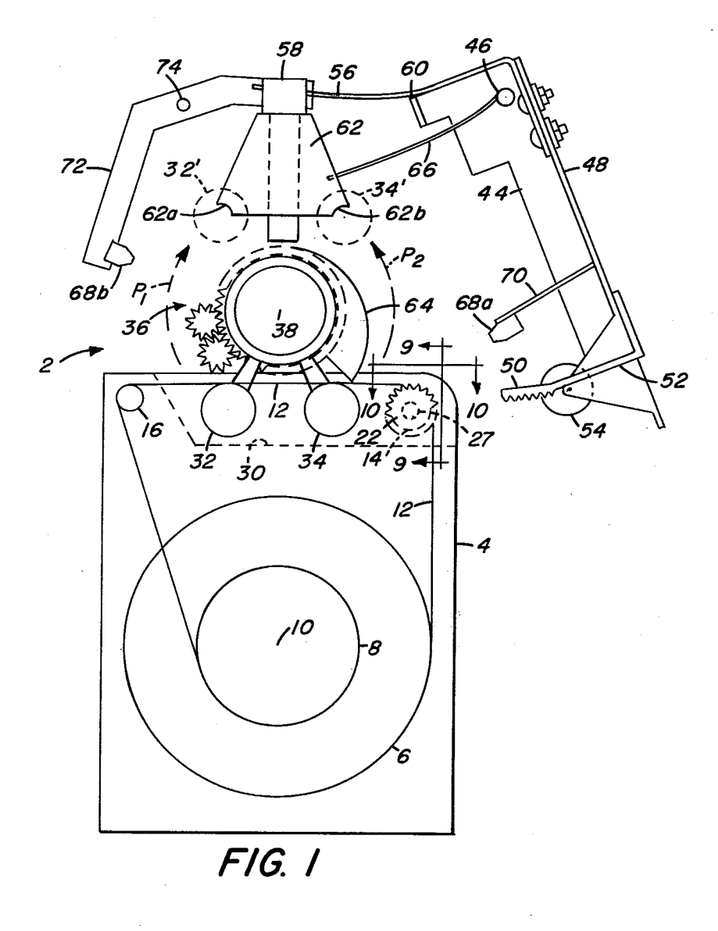
FIGS. 1 and 2 are top views of two positions of a presently preferred embodiment of the invention.

Referring specifically to FIG. 1, there are shown the parts of a helical video recorder which are sufficient for an understanding of the present invention. A helical tape recorder 2 is provided with space on its playing deck for accepting a coaxial-reel cassette 4. A supply reel 6 and a takeup reel 8 are coaxially disposed with relation to each other and rotatably mounted within the cassette 4 about an axis 10. For sake of clarity, the reels 6 and 8 are shown in FIG. 1 as having different diameters. A magnetic tape 12 leaves the supply reel 6 and passes across guides 14 and 16 during the course of its travel to the takeup reel 8.

Figure 9:
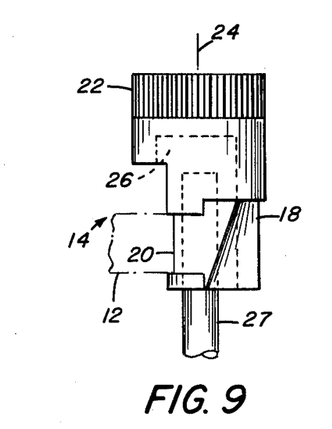
FIGS. 9 and 10 are side and front elevation views of the rotatable guidepost taken generally along lines 9—9 and 10—10, respectively, in FIG. 1.
Figure 10:
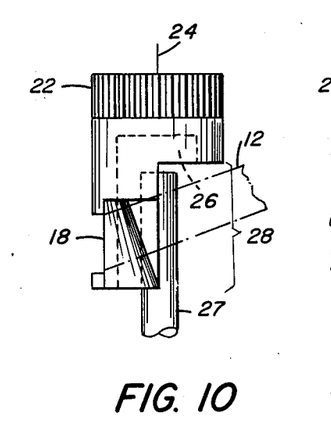

The guide post 14 thus far described is the same as that post disclosed in the above-mentioned copending application, and reference is made to that application for a more specific description of the structure, function, and operation of the guide post. To reiterate those points sufficient for an understanding of the present invention, and as better shown in FIGS. 9 and 10, the post 14 has two tape-contacting guide surfaces: a conical surface 18 formed from a portion of a frustum of an oblique circular cone and a cylindrical surface 20 formed from a portion of a right circular cylinder. The significance of these surfaces is that the plane and direction of travel of the tape 12 is changed as it passes around the conical surface 18 without incurring distortion of the tape 12, particularly across its width.

Figure 11:
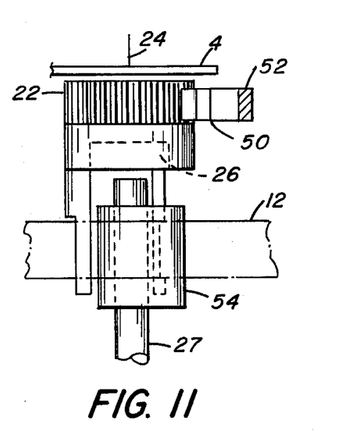
FIG. 11 shows the relationship of the rack, pinch roller, and rotatable guide as illustrated in FIG. 2, taken generally along line 11—11.

The tape 12 leaves the conical surface 18, travelling along as inclined path with respect to the coaxial reels 6 and 8, until it reaches the guide post 16. There the incline of the tape 12 is cancelled and the tape 12 is directed toward the takeup reel 8. A pinion 22 is mounted integrally with the post 14 for rotation about an axis 24. An interior portion 26 of the post 14 is hollowed out, as indicated by the dotted lines in FIGS. 9 and 10 and better seen in FIG. 11. The hollowed-out interior cavity 26 is further exposed by a cutaway side generally depicted as 28.

Figure 3:
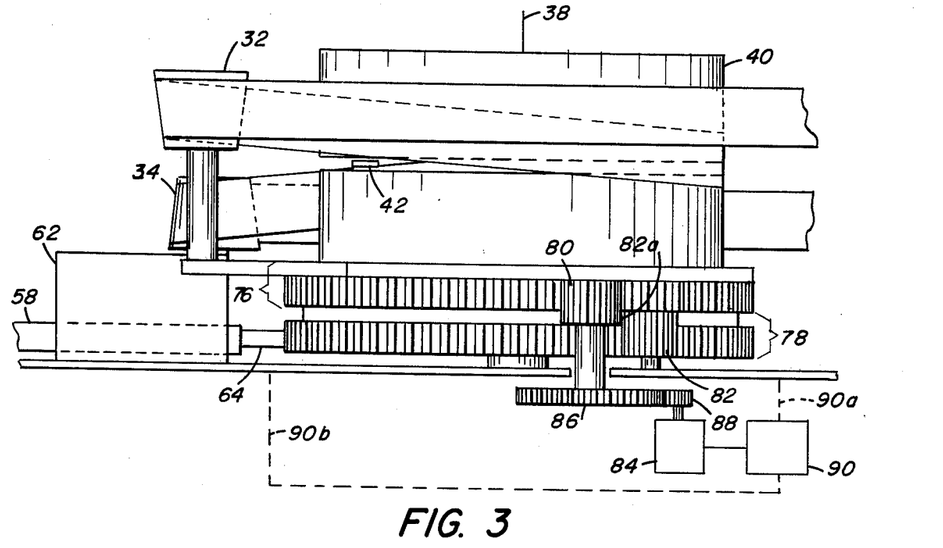
FIGS. 3 and 4 are side and front elevations of the drum assembly as pictured in FIG. 2 and taken along lines 3—3 and 4—4, respectively.
Figure 4:
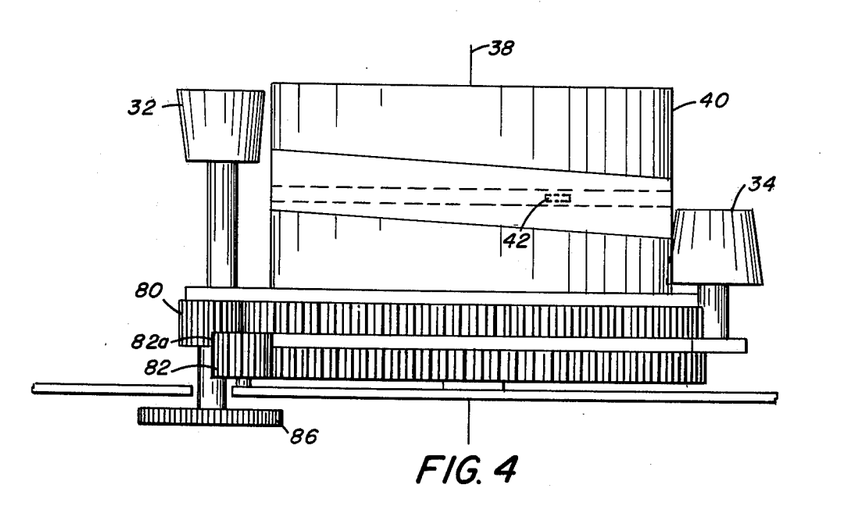
Figure 8:
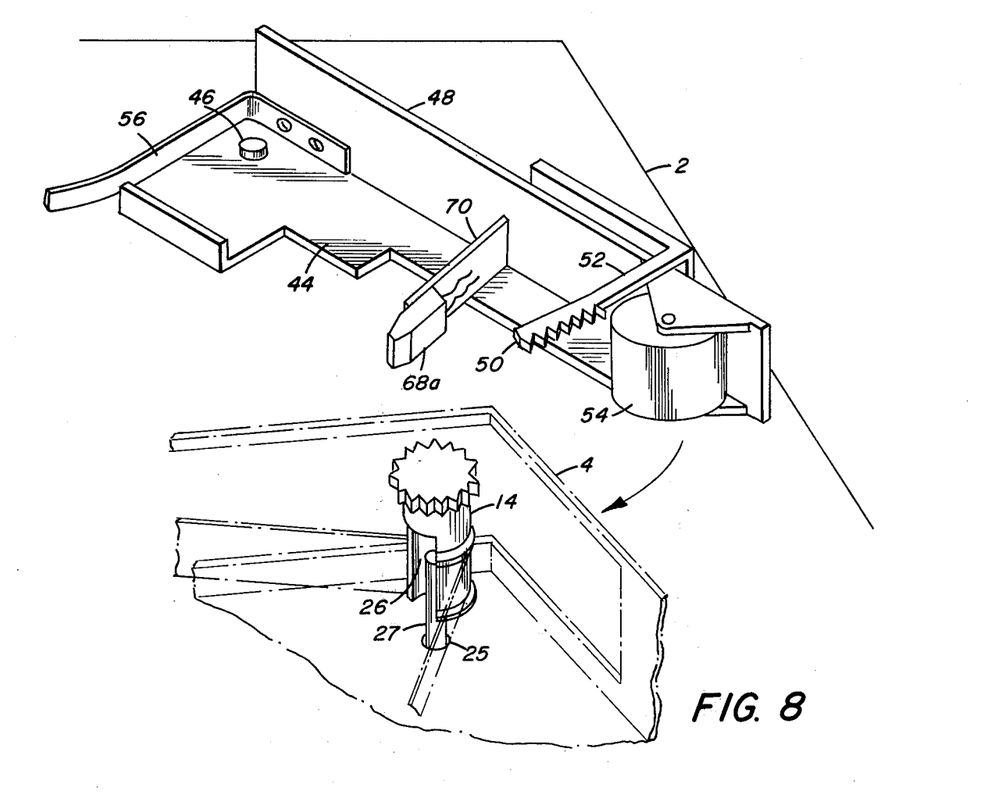
FIG. 8 is a perspective view of a part of the lever assembly of the invention.

Referring again to FIG. 1, the cassette 4 has a cutaway front face 30, hereinafter sometimes referred to as a window, which is so designed as to permit the positioning of a pair of tapered threading guides 32 and 34, also referred to as tape wrapping guides, behind the tape 12. The opening 30 is sufficiently extensive to expose the guide 14, for purposes which will be seen hereafter. The threading guides 32 and 34 are mounted on a drive gear assembly 36, specifically described in detail hereafter, for rotational movement around an axis 38. The cassette 4 is also provided with an opening 25, as shown in FIG. 8, for accepting a capstan 27. The capstan 2, the opening 25, and the hollowed-out interior cavity 26 of the post 14 are so arranged that the shaft of the capstan 27 is freely received within the hollowed-out portion 26 when the cassette 4 is emplaced on the recorder 2, as shown variously in FIGS. 8 through 11. As also seen in FIGS. 3 and 4, a recording drum 40 is provided carrying at least one recording head 42 which is also rotatable about the axis 38. The path of the recording head is slanted with respect to the tape 12 so that helical recording may take place when the tape 12 is wrapped around the drum by the movement of the guides 32 and 34.

A spring-biased lever 44 (FIG. 1) is provided for movement around a pivot 46 on the recorder 2. The lever 44 has a vertically extending side member 48, shown also in perspective in FIG. 8, which serves both to mount a rack 50 by means of a flexible arm 52 and to support for rotation a resilient pressure roller 54, sometimes herein referred to as a pinch roller. A leaf spring 56, affixed to the lever 44, is in contact with a plunger 58. The plunger 58 which is free to slide within a block 62 translates to the spring 56 the motion of a cam 64 mounted for rotation on the gear assembly 36. A return spring 66 ensures the return of the plunger 58 to the position illustrated in FIG. 1 when the cam 64 releases the plunger 58 in a manner to be hereafter described.

This embodiment also coordinates the moving of two recording and/or erase heads into contact with the tape 12 as the tape wraps around the recording drum 40. A magnetic erase head 68a is mounted on a plate 70 which is attached to the lever 44. Another magnetic head 68b is mounted on one end of a bell crank 72, which in turn rotates around a pivot 74. The other end of the bell crank 72 fits within a slot in the plunger 58.

Figure 2:
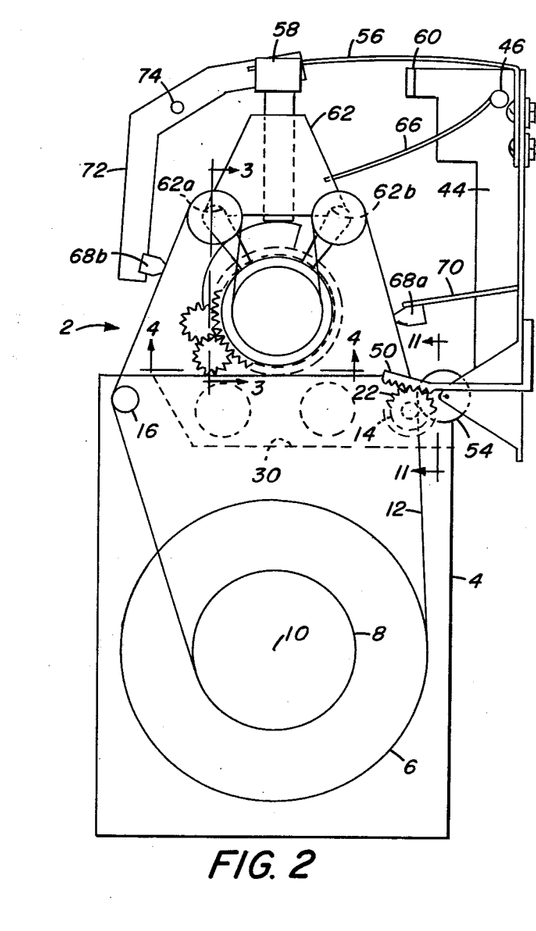
Figure 5:
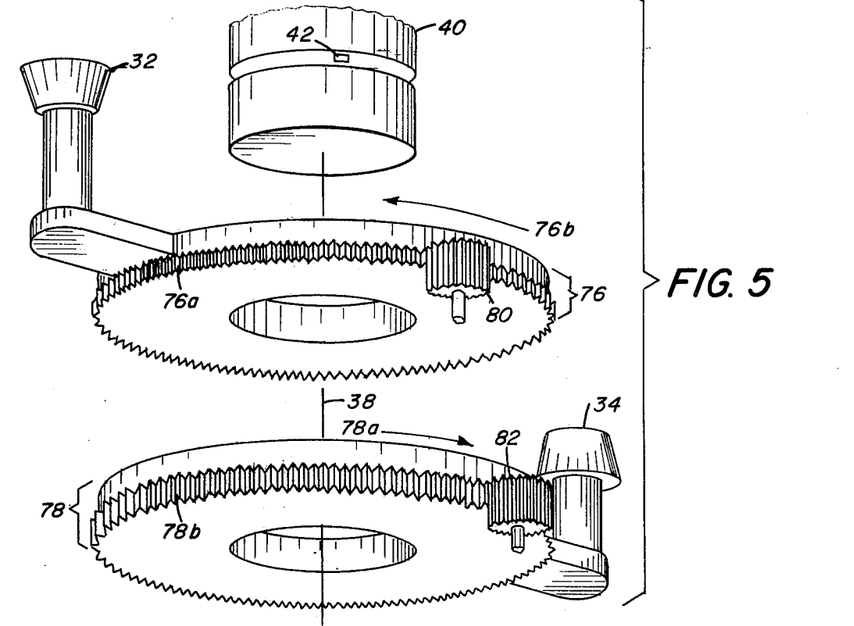
FIG. 5 is an exploded perspective view of an embodiment of the coaxial gears and tape guides.

One embodiment of the drive gearing 36 is depicted by FIGS. 3 through 5. The tape threading guides 32 and 34 are mounted on ring gears 76 and 78, respectively. Gear teeth 76a are generally provided on part of the vertical edge of the ring gear 76 so that a driven pinion 80 may mesh with the gear teeth 76a and rotate the ring gear 76 in the direction of arrow 76b (for tape threading) without encountering the threading guide 32. An idler pinion 82, mounted for rotation on the recorder, is counter driven by the pinion 80 through their mutual contact at an edge 82a (FIGS. 3 and 4). The idler pinion 82 in turn rotates the ring gear 78 in a direction shown by arrow 78a (for tape threading). Gear teeth 78b are provided on only a part of the vertical edge of the ring gear 78 so that clearance is provided for the pinions 80 and 82 to mutually contact at the edge 82a. A reversible, low speed motor 84, shown schematically in FIG. 3, powers the driven pinion 80 through a gear train including, for example, gears 86 and 88. A motor control unit 90 selectively responds, as schematically represented by the dotted lines 90a and 90b, to the two extreme positions of the tape threading guides 32 and 34 (as illustrated in FIGS. 1 and 2). Switching equipment in the motor control unit 90 thereupon selectively determines in which direction the motor 84 should drive the pinions and, after motor 84 is enabled, selectively determines at what point the motor 84 should be disabled. One of ordinary skill in the art will recognize various motors and switching circuits which will suitably perform in this application.

Figure 6:
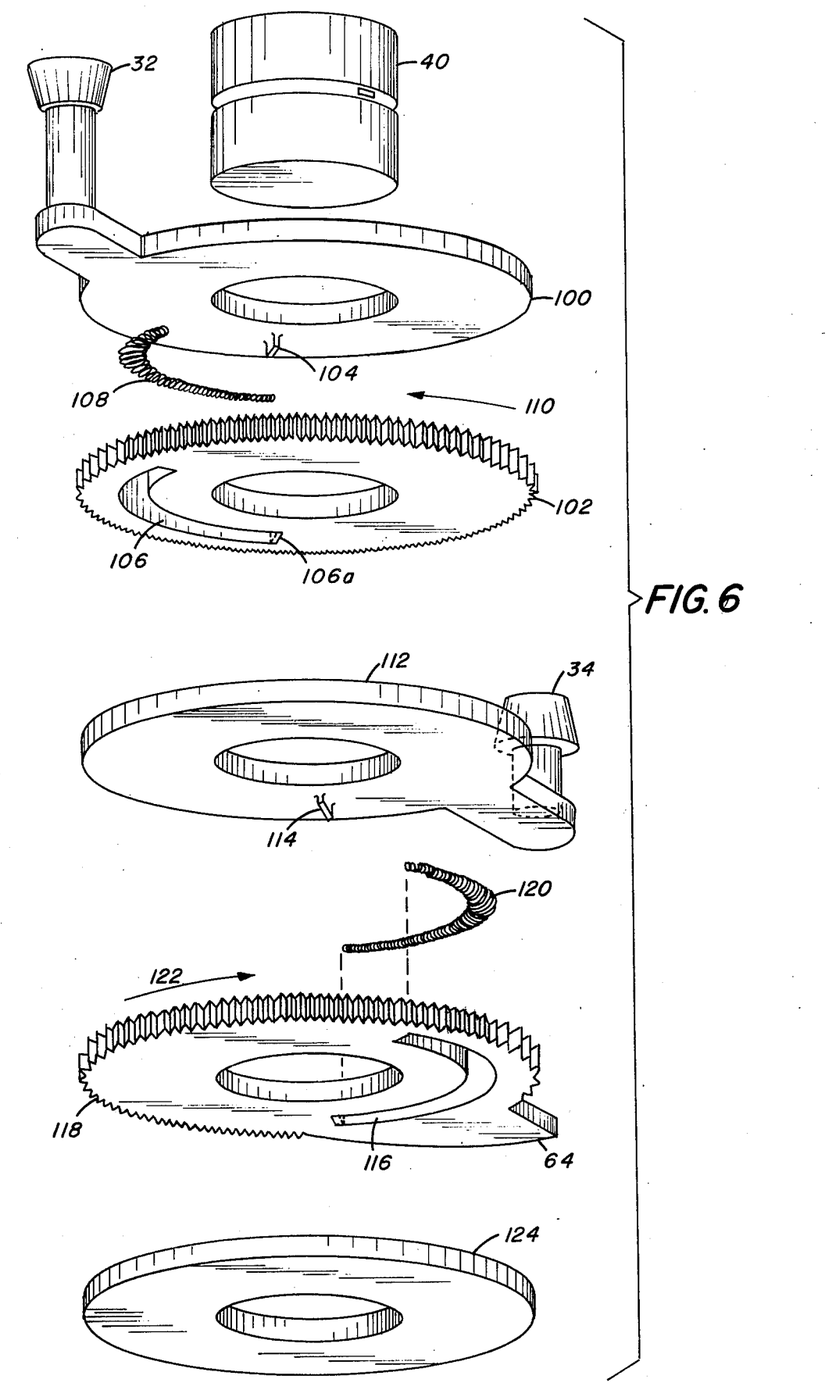
FIG. 6 is an exploded perspective view of an embodiment of the coaxial gears and yieldable tape guides.
Figure 7:
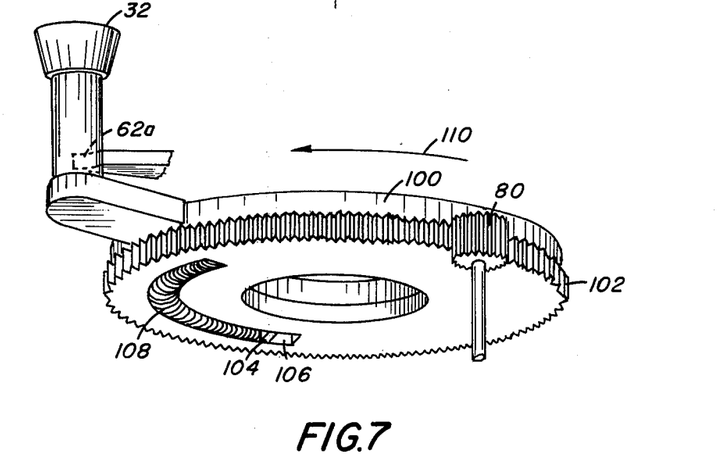
FIG. 7 is a perspective view of one gear and guide combination, showing the guide yieldably forced against a stop.

Turning now to FIG. 6, there is shown the presently preferred form of the drive gearing 36. The principal difference between this gearing and that illustrated in FIG. 5 is that the threading guides 32 and 34 are mounted on separate plates which are yieldably engaged with the coaxial ring gears. The threading guide 32 is mounted on a plate 100 which can slidably rotate over a ring gear 102. The plate 100 has a tab 104 which, when the plate 100 is placed over the gear 102, extends into an arcuate slot 106 formed in the ring gear 102. A spring 108 fits within the slot 106 and biases the tab 104 against a rear wall 106a of the slot 106. As better shown in FIG. 7, when the driven pinion 80 rotates the ring gear 102 in the direction of arrow 110, the spring 108 provides sufficient bias to the tab 104 that the plate 100 and its associated guide 32 also rotate in the direction of the arrow 110. When the guide 32 strikes a stop face 62a of the block 62, the pinion 80 may continue to rotate, only now against the force of the spring 108, until it is disabled by the motor control unit 90. Thus, the apparatus accurately positions the guide 32 against the precisely determined stop face 62a and tensions the plate 100, by means of the spring 108, so that tape travelling past the guide 32 will not, in normal operation, pull the guide 32 out of its precise position. In the process, gear "slop" or "play" has been factored out of the determination of the stopping position of the guide 32.

Referring again to FIG. 6, the tape threading guide 34 is mounted on a plate 112. The plate 112 has a tab 114 which penetrates a slot 116 formed in a ring gear 118. These members, together with a spring 120, perform the same function as that described for the ring gear 102 and its associated members, except that rotation occurs under the driving force of the idler pinion 82 and in the direction of arrow 122. The cam 64 is integrally formed on the ring gear 118. As the cam 64 displaces the plunger 58, as shown in FIG. 2, the threading guide 34 is accurately positioned against a stop face 62b of the block 62. A bottom plate 124 is attached to the bottom of the drive gearing pictured in FIG. 6 to hold the spring 120 in place within the slot 116.

FIGS. 1 and 2 illustrate the two modes of operation of the presently preferred embodiment. FIG. 1 shows the apparatus in a position as depicted in partial perspective by FIG. 8 wherein the tape passes across the guides 14 and 16 from the supply reel 6 to the takeup reel 8. The guide post 14 presents the conical surface 18 to the tape which inclines the tape toward the guide post 16 and the level of the takeup reel 8. In addition, the tape 12 is guided onto the conical surface 18 by the cylindrical surface 20. To commence the wrapping operation, the tape threading guides 32 and 34 rotate about the axis 38 along paths $P_1$ and $P_2$, respectively (shown by broken lines), until they reach positions 32' and 34' (also shown by broken lines). In these positions, further illustrated in FIG. 2, the tape 12 is helically wrapped around the drum 40 so that the head 42 inscribes an oblique path across the tape 12. To reach these positions, the drive gearing, discussed in connection with FIGS. 6 and 7, selectively rotates the tape threading guides 32 and 34 from the unwrapped position (FIG. 1) to the wrapped position (FIG. 2). In the wrapped position, the threading guides 32 and 34 are yieldably positioned against the stop faces 62a and 62b, respectively.

The cam 64 rotates concurrently with the movement of the threading guide 34, also in the direction of the path $P_2$. As the cam 64 proceeds to the position portrayed in FIG. 2, the face of the cam 64 encounters the plunger 58 and cams it through the block 62 against leaf spring 56. The spring 56 forces the lever 44 in a clockwise direction so that the rack 50 enters the open front face 30 of the cassette 4 and engages the pinion 22 on the guide post 14. The rotation of the guide post 14 accomplishes several functions in the cassette 4. Both the cylindrical surface 20 and the conical surface 18 are moved out of contact with the tape 12; simultaneously, the cut-away side 28 is moved adjacent the tape 12, revealing the capstan 27 inside, and the tape 12 falls into contact with the capstan 27. The pinch roller 54 resiliently urges the tape 12 into driving engagement with the capstan 27. As the tape 12 is pulled through the path P$_2$ by threading guide 34, the head 68a is moved into engagement with the tape 12. Simultaneously, the plunger 58 rotates the bell crank 72 around the pivot 74 and moves the head 68b into engagement with the tape 12 as it is being withdrawn along the path P$_1$ by the threading guide 32. With all these interrelated movements completed as shown by FIG. 2, recording may commence.

When it is desired to draw the tape 12 back into the cassette 4, all the movements are basically reversed. Of particular mention, when the cam 64 releases the plunger 58, the lever 44 and the bell crank 72 will begin to rotate in response to the tension of the return spring 66 until resuming the position depicted in FIG. 1. The guide post 14 is simultaneously counter rotated by the retreating rack 50 until the surfaces 18 and 20 are again presented to the tape 12.

The invention has been described in detail with particular reference to presently preferred embodiments thereof, but it will be understood that variations and modifications can be effected within the spirit and scope of the invention. For example, while the invention has been described in connection with its use with a coaxial-reel cassette, the yieldable, coaxially driven tape wrapping guides are also adapted to engage the tape in a non-coaxially disposed reel-to-reel helical recorder and wrap the tape around a recording drum.

What is claimed is:

1. For use with a helical scan tape recorder and with a cassette of the type wherein magnetic tape is withdrawn from the cassette and directed around a recording drum which supports at least one recording head that helically scans the tape, the cassette having a window across or through which the tape is adapted to extend or be withdrawn, apparatus for withdrawing the tape from the cassette and helically wrapping it around the recording drum, comprising:

a first gear mounted for rotation about an axis from a first position to a second position;

a second gear mounted on a common axis with respect to said first gear for rotation from a third position to a fourth position, said second gear disposed to rotate counter to the rotation of said first gear;

a first tape threading guide post mounted on said first gear and a second tape threading guide post mounted on said second gear, said posts having tape guiding surfaces for directing the tape around the drum and across the path of the recording head, said first and third positions being positioned relative to the recording drum for locating said posts within the cassette when the cassette is emplaced on the recorder, said second and fourth positions being positioned relative to the recording drum for locating said posts alongside the drum for helically guiding the tape around the drum;

gear drive means for rotating said first gear from said first position to said second position and said second gear from said third position to said fourth position so that, when the cassette is emplaced on the recorder, said posts will engage the tape in said first and third positions and withdraw the tape through the window until said gears reach said second and fourth positions, thereby helically wrapping the tape around the recording drum;

means for biasing said first and second tape threading guide posts for maintaining said posts at predetermined locations on said first and second gears, respectively; and means for counter rotating said tape threading guide posts, against said bias and relative to the rotation of said gears, for positioning said posts independent of said second and fourth positions of said first and second gears, respectively.

2. The apparatus of claim 1 wherein said means for counter rotating said posts comprises a member on the recorder for restraining further rotational movement of said posts relative to the drum and for forcing said posts to rotate relative to said rotating gears and against said bias, said member having a stop edge which stops and positions said posts for helically wrapping the tape around the drum.

3. For use in helical scan tape recorder of the type wherein a magnetic tape is helically wrapped around a recording drum which supports at least one recording head that helically scans the tape, wherein means are provided for helically wrapping the tape around the drum, the improvement wherein the means comprise:

a first ring gear mounted for clockwise rotation, said first ring gear having thereon a first tape threading guide for wrapping the tape clockwise around the drum;

a second ring gear mounted substantially adjacent said first ring gear for counterclockwise rotation, said second ring gear having thereon a second tape threading guide for wrapping the tape counterclockwise around the drum, said first and second ring gears having a common axis and being of substantially the same diameter, said ring gears, when substantially adjacent, defining an edge region therebetween without gear teeth thereon;

gear means for driving said first and second ring gears from a first position wherein said posts engage the tape at a distance from the recording drum to a second position wherein said posts pull the tape from said first position and helically wrap the tape around the drum, said gear means including a driven gear for rotating one said ring gear and an idler gear for counter rotating said other ring gear, said driven gear engaging said idler gear within said edge region of said ring gears; and a stop member on the recorder disposed to engage and stop said first and second tape threading guides at a predetermined point in their clockwise and counterclockwise motion, respectively, and wherein said first and second tape threading guides are yieldably mounted to said first and second gears, respectively, for movement therewith until engaging said stop member at which predetermined point said guides yield to further movement of said gears, thereby completing the helical wrapping of the tape around the recording drum.

4. For use in a helical scan tape recorder which cooperates with a cassette of the type wherein means are provided for pulling a magnetic tape from the cassette and wrapping it around a recording drum which supports at least one recording head that helically scans the tape, the cassette having a rotatably, hollowed-out post in which a capstan fits, means for rotating the post from a position wherein a guide surface thereon contacts the tape to a position wherein the capstan fitted therein is exposed for contact with the tape, the improvement:

a. wherein the means for withdrawing the tape from the cassette and helically wrapping it around the drum comprises:

a first gear mounted for clockwise rotation, said first gear having thereon a first tape threading guide for pulling a span of tape from the cassette and wrapping it clockwise around the drum;

a second gear mounted for counterclockwise rotation, said second gear having thereon a second tape threading guide for pulling a span of tape from the cassette and wrapping it counterclockwise around the drum, said first and second gears having a common axis; and       gear means for driving said first and second gears from a first position wherein said posts engage the tape within the cassette to a second position wherein said posts pull the tape from the cassette and helically wrap the tape around the drum; and    b. wherein the means for rotating the rotatable, hollowed-out post in the cassette comprise means responsive to said gear means for rotating the hollowed-out post and for bringing a pinch roller into driving engagement with the capstan exposed therein.

5. The apparatus of claim 4 wherein said means responsive to said gear means for rotating the hollowed-out post further comprise:

mechanical means, including a lever, for pivoting said pinch roller into contact with the capstan; and    a cam mounted on one of said gears for imparting motion to said mechanical means.

6. The apparatus of claim 5 further comprising a stop member on the recorder disposed to engage and stop said first and second tape threading guides at a predetermined point in their clockwise and counterclockwise motion, respectively, and wherein said first and second tape threading guides are yieldably mounted to said first and second gears, respectively, for movement therewith until engaging said stop member at which predetermined point said guides yield to further movement of said gears so that the tape is helically wrapped around the recording drum.

7. A helical scan video tape recorder for use with a cassette of the type having a window for withdrawing a magnetic tape therethrough and further having a hollowed-out, cut-away guide post for containing a capstan therein, the post being rotatable from a position wherein a guide surface thereon contacts the tape to a position wherein the cutaway exposes the capstan fitted thereon for contact with the tape, the combination comprising:

a cylindrical recording drum supporting at least one recording head for rotation about an axis thereon;

a first gear mounted for clockwise rotation about said axis, said first gear having thereon a first tape threading guide for withdrawing a span of tape from the cassette through the window and wrapping it clockwise around the drum;

a second gear mounted for counterclockwise rotation about said axis, said second gear having thereon a second tape threading guide for withdrawing a span of tape from the cassette through the window and wrapping it counterclockwise around the drum;

a stop member disposed on the recorder to engage and stop said first and second tape threading guides at a predetermined point in their clockwise and counterclockwise motion, respectively;

means for yieldably mounting said first and second tape threading guides to said first and second gears for movement therewith until said posts engage said stop member, at which said predetermined point said guides complete the helical wrapping of the tape around said drum and resist further movement of said gears;

pinion gear means for rotating one of said gears and idler means for counter rotating other of said gears, said pinion gear means being in driving engagement with said idler gear means for rotating both said first and second gears from a first position wherein said tape threading guides engage the tape within the cassette to a second position wherein said guides withdraw the tape through the window and helically wrap the tape around the drum;

mechanical means for rotating the rotatable, hollowed-out post and for pivoting a pinch roller into driving engagement with the capstan thus exposed therein through the cutaway; and    a cam mounted on one of said first and second gears for imparting motion to said mechanical means responsive to the rotation of said gears.

* * * * *